Jan. 22, 1924.
R. N. EVANS
FENDER
Filed Dec. 24, 1921
1,481,699
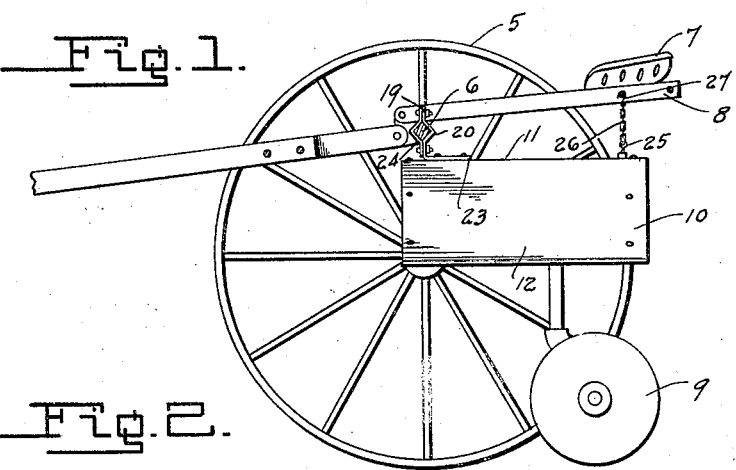
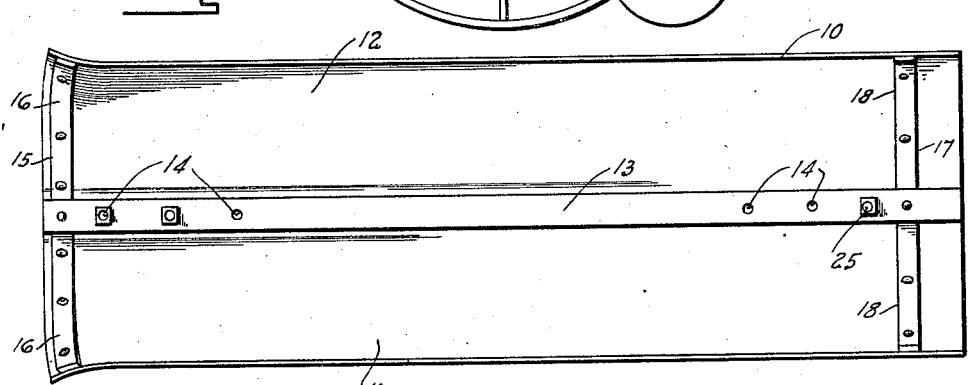
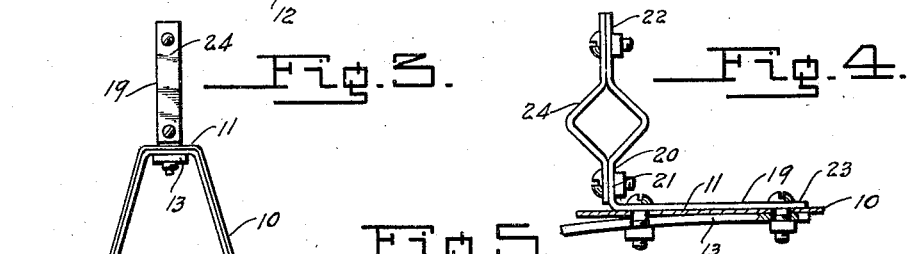
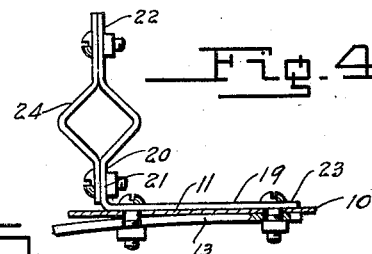
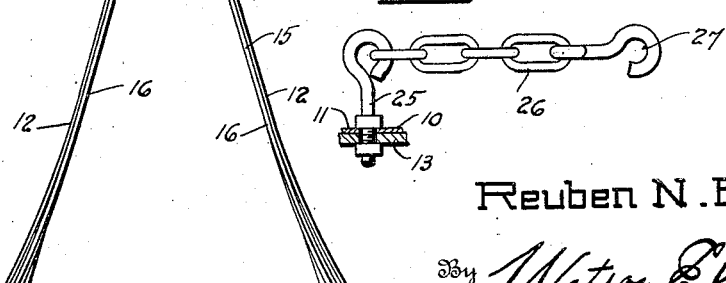
Inventor
Reuben N. Evans
By Watson E. Coleman
Attorney Patented Jan. 22, 1924.

1,481,699

UNITED STATES PATENT OFFICE.

REUBEN N. EVANS, OF DELL RAPIDS, SOUTH DAKOTA.

FENDER.

Application filed December 24, 1921. Serial No. 524,580.

*To all whom it may concern:*

Be it known that I, REUBEN N. EVANS, a citizen of the United States, residing at Dell Rapids, in the county of Minnehaha and State of South Dakota, have invented certain new and useful Improvements in Fenders, of which the following is a specification, reference being had to the accompanying drawings.

This invention relates to fenders and more particularly to fenders for agricultural implements.

It is an object of the invention to provide a fender of this character capable of being readily applied to the various types of agricultural implements to protect the operator from water thrown off in the operation of the ground treating implements when the implement is traveling through a field after a rain or heavy dew.

It is another object of the invention to provide a fender of this character capable of being readily applied and adjusted to accommodate the fender to the implement according to its size and the position desired.

It is a further object of the invention to provide a fender of this character which is connected to the frame of the implement and suspended beneath the operator's seat.

It is still a further object of the invention to provide a fender of this character which efficiently protects the operator against water splashing from the ground treating implements without requiring the fender to be extended a great distance or beyond the side edges of the seat.

With these and other objects in view, the invention consists in the improved construction and arrangement of parts to be hereinafter more particularly described, fully claimed and illustrated in the accompanying drawings, in which:—

Figure 1 is a view in elevation of an agricultural implement, showing the fender applied, one side portion of the implement being removed to properly show the fender;

Figure 2 is a bottom plan view of the fender;

Figure 3 is a front elevation;

Figure 4 is a detailed view of the connecting bracket; and

Figure 5 is a detailed view of the means for connecting the rear end of the fender to the implement.

Referring to the drawings, 5 designates an agricultural implement including a shaft 6 and an operator's seat 7, the seat being disposed in spaced relation to the shaft 6 by supports 8, the ground treating implements 9 being disposed below and in spaced relation to the shaft 6. When an implement of this character is traveling through a field after dew fall, the ground treating implements, while they operate efficiently, at the same time cause the weeds or vegetation to discharge or throw off moisture which comes in contact with and wets the operator occupying the seat of the implement. In order to overcome this disadvantage and permit the work to proceed as rapidly as desired without endangering the health of the operator or making the work uncomfortable, there is provided a novel form of fender 10 consisting of a sheet of material, preferably metal, which is extended or bent to provide a relatively flat top 11 and sides 12, the sides being extended in angular relation to the top and in divergent relation to each other so that a substantially V-shaped fender is provided. It is of course obvious that the fender may be made in various lengths, according to the type of machine on which the same is to be used, but this is not entirely necessary, as the fender may be adjusted to accommodate the same to implements of various sizes by means to be hereinafter described.

To permit the fender to retain its shape, a reinforcing bar 13 is extended longitudinally of the top and in engagement with the lower surface of said top, said bar being provided adjacent each end with a series of openings 14. Disposed at the forward end of the fender and connected to the forward end of the strip or bar 13 is a brace 15, said brace being substantially V-shaped, the bight portion of the brace being secured to the forward end of the bottom of the fender 10 between said fender and the forward end of the strip or bar 13, suitable fastening means such as rivets, or bolts being used to connect the brace to the fender and to the bar 13. The arms 16 of the brace 15 not only extend in divergent relation from the bight portion of the brace, but are substantially skewed at their intermediate portions, the arms 16 being secured to the inner face of the sides 12 of the fender. By this means the forward ends of the sides are substantially flared outwardly and held in this position through the medium of the brace 15 to provide a mouth for the fender which greatly assists in preventing splashing or discharge of water upon the parts of the implement disposed above the fender by permitting the vegetation or water to enter the fender. A brace 17 is provided for the rear end of the fender, said brace being substantially V-shaped or in other words, conforming to the shape of the fender, the arms 18 of the brace being disposed in divergent relation to each other and secured to the fender inwardly of the rear edge of the fender. The bight portion of the brace 17, similar to the brace 15 is disposed between the rear end of the bar 13 and the top of the fender. Rivets, bolts or like fastening means are used to connect the bar 13 and brace 17 to the fender.

The attaching means of the fender embody a bracket 19 consisting of a strip of material having its end portion 20 extended upwardly and then inwardly to provide a V-shaped bearing or recess and then upwardly, the portions 21 and 22 of the end portion 20 being provided with openings, openings being also provided in the opposite end portion 23. A clamping section 24 is provided for use in connection with the end portion 20, said clamping section consisting of a strip of material extended or bent at its intermediate portion to provide a V-shaped recess, the end portions of said strip being provided with openings intended to register with openings provided in the portions 21 and 22 of the end portion 20, bolts being passed through said registering openings in order to clamp the bracket to the shaft 6 of the agricultural implement. By making the end portion 23 of the bracket relatively long, it is possible to not only firmly secure the bracket to the forward end of the top of the fender, but to adjust said bracket longitudinally of the top in order to permit the fender to occupy the position desired regardless of the size or position of the shaft 6, the shaft, of course, being disposed in the recesses formed in the end portion 20 and the clamping member 24.

To connect the opposite end of the fender, an eye bolt 25 is provided, said eye bolt being disposed in one of the openings 14 provided in the top 11 and bar 13. Two nuts are used to secure the bolt to the fender, one engaging the outer face of the top 11 and the remaining nut engaging the bar 13 to firmly lock the bolt on the fender. A chain 26 is secured to the eye portion of the bolt 25, the opposite end of the chain being provided with a hook 27 adapted to be connected to that portion of the seat support immediately beneath the seat. In view of the fact that both the forward and rear ends of the top 11 and bar 13 are provided with a series of openings, it is not only possible to adjust the bracket 19 longitudinally of the top, but to also adjust the eye bolt. When the device is not needed it may be readily detached from the implement by simply releasing the clamping member 24 in order to disengage the bracket from the shaft 6, and disengage the hook from the support of the seat.

From the foregoing it will be readily seen that this invention provides a novel form of fender which efficiently protects the operator of a vehicle against water, dirt and like matter. An important feature of this device is that the sides of the fender diverge with respect to each other and the top of the fender so that they are positioned to catch all matter discharged during the travel of the implement over the ground, thus eliminating the necessity of disposing all portions of the fender in the same plane, and as it is thoroughly reinforced by the novel form of braces, there is no danger of the same being deformed by vibration of the agricultural implement on which it is used.

What is claimed is:—

1. An operator's fender for agricultural implements embodying an implement including a driver's seat, a body member disposed adjacent the seat, said body member having downwardly divergent sides, braces disposed within the forward and rear ends of the body member and secured to said sides and said body member, a bracket carried by one end of said body member for engagement with a portion of the implement, and a chain connected to the opposite end of said body member for engagement with a portion of the implement adjacent the seat, said bracket and chain being adjustable longitudinally of the body member.

2. In combination with an agricultural implement having a seat supporting member, a substantially elongated V-shaped fender body, the extremities of one end portion of said body being flared, braces carried by each of said end portions, a reinforcing bar, extending longitudinally of the bight portion of the fender, a bracket disposed exteriorly of one end portion of the bight portion of the fender, said bracket being secured to the reinforcing bar and adapted to engage an axle of the implement, a chain adjustably connected to the opposite end portion of the bight portion of the fender and to the reinforcing member, said chain being adapted to engage the seat supporting member of the implement, whereby the fender is positioned closely adjacent and substantially parallel to the seat supporting member.

In testimony whereof I hereunto affix my signature.

REUBEN N. EVANS.